(12) United States Patent
Seo et al.

(10) Patent No.: US 8,371,975 B2
(45) Date of Patent: Feb. 12, 2013

(54) POWER TRAIN FOR HYBRID VEHICLE

(75) Inventors: Kangsoo Seo, Gyeonggi-Do (KR);
Hyutae Shim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 467 days.

(21) Appl. No.: 12/629,490

(22) Filed: Dec. 2, 2009

(65) Prior Publication Data
US 2010/0273595 A1   Oct. 28, 2010

(30) Foreign Application Priority Data
Apr. 23, 2009   (KR) .................. 10-2009-0035352

(51) Int. Cl.
*F16H 3/72* (2006.01)
*F16H 3/44* (2006.01)

(52) U.S. Cl. ............ 475/5; 475/282; 475/288; 475/317; 903/911

(58) Field of Classification Search ................ 475/282, 475/288, 317; 903/911
See application file for complete search history.

(56) References Cited

U.S. PATENT DOCUMENTS

| 2005/0064974 A1 * | 3/2005 | Bezian et al. ............. 475/5 |
| 2005/0096170 A1 * | 5/2005 | Holmes ..................... 475/5 |
| 2007/0225097 A1 * | 9/2007 | Raghavan et al. ........ 475/5 |

FOREIGN PATENT DOCUMENTS

| JP | 2004 345527 A | 12/2004 |
| JP | 2005 067319 A | 3/2005 |
| JP | 2005 075095 A | 3/2005 |
| JP | 2006194452 A | 7/2006 |
| JP | 2006 282069 A | 10/2006 |
| JP | 2008-120138 | 5/2008 |
| KR | 10-20080004283 U | 1/2008 |
| KR | 10-20090113652 A | 11/2009 |

* cited by examiner

*Primary Examiner* — Edwin A Young
(74) *Attorney, Agent, or Firm* — Edwards Wildman Palmer LLP; Peter F. Corless

(57) ABSTRACT

A power train for a hybrid vehicle comprising may include: a first planetary gear set including rotary elements; a second planetary gear set including rotary elements at least one of which is connected with at least one of the rotary elements of the first planetary gear set; a first clutch that is configured to connect/disconnect one of the rotary elements of the first planetary gear set with/from one of the rotary elements of the second planetary gear set; and a first brake that is configured to restrain rotation of one rotary element of the second planetary gear set, wherein at least two or more independent power sources and an output element are connected to come of the rotary elements of the first planetary gear set and the second planetary gear set.

21 Claims, 18 Drawing Sheets

FIG.1B

| ITEM | | C1 | BK1 | BK2 | REFERENCE |
|---|---|---|---|---|---|
| EV | | | ● | | MG2 ACTIVATED |
| | | ● | ● | | MG1/2 ACTIVATED |
| COMPLEX SPLIT | | ● | | | |
| INPUT SPLIT | | | ● | | |
| FIXED GEAR RATIO | FIRST STAGE | ● | | ● | |

FIG.3B

| ITEM | C1 | BK1 | REFERENCE |
|------|----|----|-----------|
| EV | ● | ● | MG2 ACTIVATED |
| COMPLEX SPLIT | ● | | MG1/2 ACTIVATED |
| INPUT SPLIT | | ● | |

FIG. 4B

| ITEM | | C1 | BK1 | BK2 | BK3 | REFERENCE |
|---|---|---|---|---|---|---|
| EV | | | ● | | | MG2 ACTIVATED |
| | | ● | ● | | | MG1/2 ACTIVATED |
| COMPLEX SPLIT | | ● | | | | |
| INPUT SPLIT | | | ● | | | |
| FIXED GEAR RATIO | FIRST STAGE | ● | ● | | | |
| | SECOND STAGE | ● | | ● | | |
| | THIRD STAGE | ● | | | ● | |

FIG.5B

| ITEM | | C1 | C3 | BK1 | REFERENCE |
|---|---|---|---|---|---|
| EV | | ● | | ● | MG2 ACTIVATED |
| COMPLEX SPLIT | | ● | | ● | MG1/2 ACTIVATED |
| INPUT SPLIT | | | | ● | |
| FIXED GEAR RATIO | FIRST STAGE | ● | ● | ● | |
| | SECOND STAGE | | ● | | |

FIG.6B

| ITEM | | C1 | C3 | BK1 | BK2 | BK3 | REFERENCE |
|---|---|---|---|---|---|---|---|
| EV | | | | ● | | | MG2 ACTIVATED |
| | | ● | | ● | | | MG1/2 ACTIVATED |
| COMPLEX SPLIT | | ● | | | | | |
| INPUT SPLIT | | | | ● | | | |
| FIXED GEAR RATIO | FIRST STAGE | | ● | ● | | | |
| | SECOND STAGE | ● | | ● | | | |
| | THIRD STAGE | ● | | | ● | | |
| | FOURTH STAGE | ● | ● | | | ● | |
| | FIFTH STAGE | ● | | | | ● | |

FIG.7B

| ITEM | | C1 | C2 | C3 | BK1 | BK2 | REFERENCE |
|---|---|---|---|---|---|---|---|
| EV | | | | | ● | | MG2 ACTIVATED |
| | | ● | ● | | ● | | MG1/2 ACTIVATED |
| COMPLEX SPLIT | | ● | ● | | | | |
| OUTPUT SPLIT | | ● | | ● | | | |
| INPUT SPLIT | | | ● | ● | ● | | |
| FIXED GEAR RATIO | FIRST STAGE | ● | ● | ● | ● | | |
| | SECOND STAGE | ● | ● | ● | | ● | |
| | THIRD STAGE | ● | ● | ● | | ● | |

FIG.8B

| ITEM | | C1 | C2 | BK1 | BK2 | BK3 | REFERENCE |
|---|---|---|---|---|---|---|---|
| EV | | | ● | ● | | | MG2 ACTIVATED |
| | | ● | ● | ● | | | MG1/2 ACTIVATED |
| COMPLEX SPLIT | | ● | ● | | | | |
| INPUT SPLIT | | | ● | ● | | | |
| FIXED GEAR RATIO | FIRST STAGE | | | ● | | | |
| | SECOND STAGE | ● | | | ● | | |
| | THIRD STAGE | ● | | | | ● | |

FIG.9B

| ITEM | | C1 | C2 | C3 | BK1 | BK2 | BK3 | REFERENCE |
|---|---|---|---|---|---|---|---|---|
| EV | | | ● | | ● | | | MG2 ACTIVATED |
| | | ● | ● | | ● | | | MG1/2 ACTIVATED |
| COMPLEX SPLIT | | ● | ● | | | | | |
| INPUT SPLIT | | | ● | | ● | | | |
| FIXED GEAR RATIO | FIRST STAGE | | ● | ● | ● | | | |
| | | | | ● | ● | | ● | |
| | SECOND STAGE | | ● | | ● | | ● | |
| | THIRD STAGE | ● | ● | | | ● | | |
| | | ● | | | | ● | ● | |
| | FOURTH STAGE | ● | ● | ● | | | | |
| | | ● | | ● | | | ● | |
| | FIFTH STAGE | ● | ● | | | | ● | |

POWER TRAIN FOR HYBRID VEHICLE

CROSS-REFERENCE TO RELATED APPLICATIONS

The present application claims priority to Korean Patent Application Number 10-2009-0035352 filed Apr. 23, 2009, the entire contents of which application is incorporated herein for all purposes by this reference.

BACKGROUND

1. Technical Field

The present disclosure relates to a power train for a hybrid vehicle, in more detail a technology for transmitting power from power sources to the driving wheels in a hybrid vehicle equipped with two or more different power sources, including an internal combustion engine.

2. Related Art

Hybrid vehicles using an engine and a motor generator improve fuel efficiency of the vehicles by achieving functions of idle stop and regenerative braking, on the basis of a technology of driving the vehicles at low velocity by using power from the motor generator having relatively excellent low-velocity torque characteristics and driving the vehicles at high velocity by using power from the engine having relatively excellent high-velocity characteristics.

Further, hybrid vehicles do not produce exhaust gas from the engine when being driven only by a motor generator, which is recognized as an environmental-friendly vehicle technology having advantages of improving fuel efficiency and reducing exhaust gas.

A power split type device has been known in the field of power trains for hybrid vehicles, which is classified into a single mode way and a multiple mode way. The single mode way does not need an operational element for shift control, such as a clutch or a brake, but the efficiency decreases in a high-velocity traveling, such that fuel efficiency is low and an additional torque amplifier is required to be applied to large-sized vehicles.

On the other hand, the multiple mode way can be designed to be able to ensure efficiency in high-velocity traveling and amplify torque by itself in accordance with the configuration, such that it can be applied to medium- and large-sized vehicles.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide a power train for a hybrid vehicle that allows for multiple mode driving, which is combined with a way of driving at a fixed gear ratio such as the shift stages of a common transmission, and high-efficiency driving, thereby improving fuel efficiency of the vehicle.

In one aspect, the present invention provides a power train for a hybrid vehicle comprising: a first planetary gear set including rotary elements; a second planetary gear set including rotary elements at least one of which is connected with at least one of the rotary elements of the first planetary gear set; a first clutch that is configured to connect/disconnect one of the rotary elements of the first planetary gear set with/from one of the rotary elements of the second planetary gear set; and a first brake that is configured to restrain rotation of one rotary element of the second planetary gear set. In addition, at least two or more independent power sources and an output element are connected to some of the rotary elements of the first planetary gear set and the second planetary gear set.

Preferably, the power source may include an engine and a first motor generator that are connected to the first planetary gear set, and a second motor generator that is connected to the second planetary gear set. The output element may be connected to the second planetary gear set. In this case, the first planetary gear set and the second planetary gear set, and the first motor generator and the second motor generator may be coaxially arranged. Further, one rotary element of the first planetary gear set may be directly connected with one rotary element of the second planetary gear set, and the first clutch may be connected with one of the other rotary elements of the first planetary gear set and one of the other rotary elements of the second planetary gear set. In this case, preferably, the engine may be connected with the rotary element, which is connected to the first clutch, of the first planetary gear set, the first clutch may be connected to the rotary element, which is connected to the first brake, of the second planetary gear set, and the output element may be connected to one rotary element, which is not connected with the first planetary gear set and the first clutch, of the second planetary gear set. Further, the first motor generator may, suitably, be connected with the rotary element, which is not connected with the first clutch and the rotary elements of the second planetary gear set, of the first planetary gear set, and the second motor generator may, suitably, be connected to the rotary element, which is connected with the first clutch, of the second planetary gear set.

Preferably, a first ring gear of the first planetary gear set and a second sun gear of the second planetary gear set may be directly connected, the first clutch may be configured to connect/disconnect a first carrier of the first planetary gear set with/from a second ring gear of the second planetary gear set, the engine may be connected to the first carrier of the first planetary gear set, the first motor generator may be connected to a first sun gear of the first planetary gear set, the second motor generator may be connected to the second sun gear of the second planetary gear set, the first brake may be disposed to restrain rotation of the second ring gear of the second planetary gear set, and the output element may be connected to a second carrier of the second planetary gear set.

Preferably, the power train may further comprise a second brake that is configured to restrain rotation of the rotary element, which is connected with the second motor generator, of the second planetary gear set. In this case, suitably, the power train may further comprise a third brake that is configured to restrain rotation of the rotary element, which is connected with the first motor generator, of the first planetary gear set.

Preferably, the power train may further comprise a third clutch that is configured to connect/disconnect the rotary elements, which are connected with the engine and the first motor generator, of the first planetary gear set. In this case, it may further comprise a second brake that is provided to restrain rotation of the rotary element, which is connected with the second motor generator, of the second planetary gear set; and a third brake that is provided to restrain rotation of the rotary element, which is connected with the first motor generator, of the first planetary gear set.

In another aspect, the present invention provides a power train for a hybrid vehicle, comprising: a first planetary gear set that has three rotary elements; a second planetary gear set that has three rotary elements two of which are connected with two of the rotary elements of the first planetary gear set so as to connect/disconnect power transmission therebetween; a first brake that is connected to one of the rotary elements of the second planetary gear set that are connected with the rotary elements of the first planetary gear set, so as to restrain rotation of the rotary elements; and a second brake that is connected to another one of the rotary elements of the second planetary gear set that are connected with the rotary elements of the first planetary gear set, so as to restrain rotation of the rotary elements. In addition, at least two or more independent power sources and an output element are connected to the rotary elements of the first planetary gear set and the second planetary gear set.

Preferably, the power source may include an engine and a first motor generator that are connected to the first planetary gear set; and a second motor generator that is connected to the second planetary gear set. The output element may be connected to the second planetary gear set. In this case, a first clutch and a second clutch may be disposed between the pairs of rotary elements of the first planetary gear set and the second planetary gear set, respectively, the engine may be connected to the rotary element, which is connected to the first clutch, of the first planetary gear set, and the output element may be connected to the rotary element, which is not connected with any of the rotary elements of the first planetary gear set, of the second planetary gear set.

Preferably, a first clutch may be disposed to connect/disconnect a first carrier of the first planetary gear set with/from a second ring gear of the second planetary gear set, and a second clutch may be disposed to connect/disconnect a first ring gear of the first planetary gear set and a second sun gear of the second planetary gear set. In this case, the first brake and the second brake may be configured to restrain rotation of rotary elements, which are connected to the first planetary gear set through the first clutch and the second clutch, of the second planetary gear set. The power train may, suitably, further comprise a third clutch that is disposed to connect/disconnect the rotary elements, which are connected with the first motor generator and the engine, of the first planetary gear set. The power train may, also suitably, further comprise a third brake that is connected to connect/disconnect rotation of the rotary element, which is connected with the first motor generator, of the first planetary gear set. The power train may, also suitably, further comprise a third clutch that is configured to connect/disconnect the rotary element, which is connected with the engine, of the first planetary gear set with/from the rotary element, which is connected with the second motor generator, of the second planetary gear set.

The present invention allows for multiple mode driving, which is combined with a way of driving at a fixed gear ratio such as the shift stages of a common transmission, and high-efficiency driving within the entire shift ratio of a vehicle, thereby improving fuel efficiency of the vehicle.

The above and other features and advantages will be apparent from or are set forth in more detail in the accompanying drawings, which are incorporated herein, and the following Detailed Description of the Invention, which together serve to explain certain principles of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIGS. 1A-B are diagrams illustrating the structure and an operation mode table of a power train for a hybrid vehicle according to a first embodiment of the present invention.

FIGS. 3A-B are diagrams illustrating a power train with modification added to the power train of FIGS. 1A-B.

FIGS. 6A-B are diagrams illustrating the structure and an operation mode table of a power train for a hybrid vehicle according to a fourth embodiment of the present invention.

FIGS. 7A-C are diagrams illustrating the structure, an operation mode table, and a lever analysis diagram of a power train for a hybrid vehicle according to a fifth embodiment of the present invention.

FIGS. 8A-B are diagrams illustrating the structure and an operation mode table of a power train for a hybrid vehicle according to a sixth embodiment of the present invention.

DETAILED DESCRIPTION OF EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
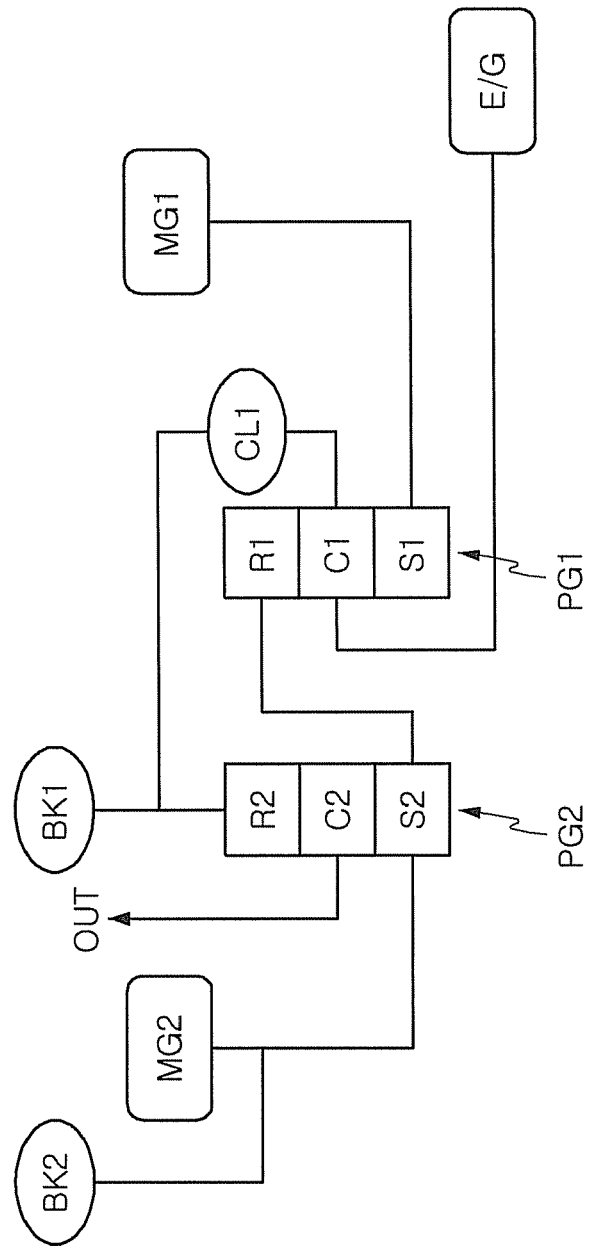
Figure 2:
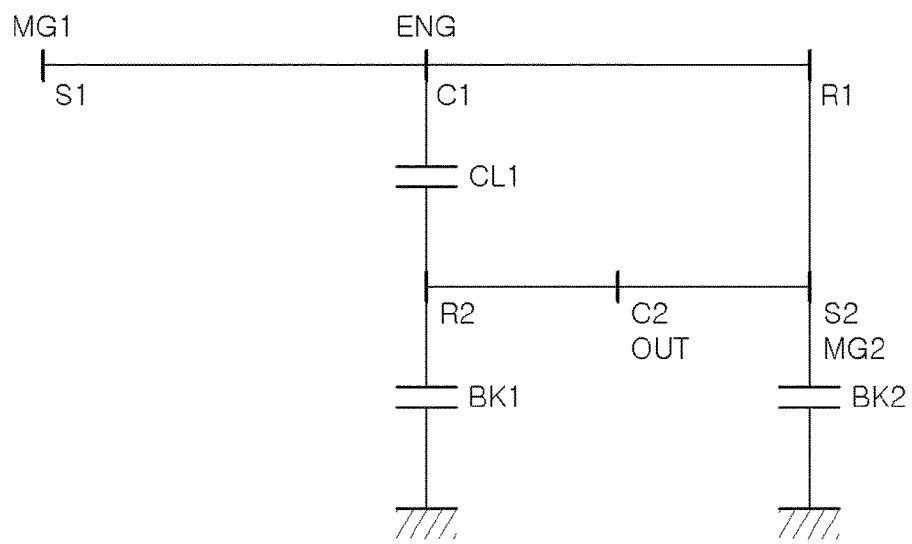
FIG. 2 is a lever analysis diagram of the power train of FIGS. 1A-B.

Referring to FIGS. 1A-B and 2, a power train for a hybrid vehicle in accordance with a first embodiment of the present invention includes: a first planetary gear set PG1 that has rotary elements; a second planetary gear set PG2 that has rotary elements at least one of which is connected with at least one of the rotary elements of the first planetary gear set PG1; a first clutch CL1 that is configured to connect/disconnect the rotary elements of the first planetary gear set PG1 with/from the rotary elements of the second planetary gear set PG2; and a first brake BK1 that is configured to restrain rotation of one rotary element of the second planetary gear set PG2, in which at least two or more independent power sources and an output element OUT are connected to the rotary elements of the first planetary gear set PG1 and/or the second planetary gear set PG2.

The power source includes an engine E/G and a first motor generator MG1 that are connected to the first planetary gear set PG1, and a second motor generator MG2 that is connected to the second planetary gear set PG2, and output element OUT is connected to the second planetary gear set PG2. The first planetary gear set PG1 and the second planetary gear set PG2, and the first motor generator MG1 of and the second motor generator MG2 are coaxially arranged.

One rotary element of the first planetary gear set PG1 is directly connected with one rotary element of the second planetary gear set PG2, and the first clutch CL1 is connected with one of the other rotary elements of the first planetary gear set PG1 and one of the other rotary elements of the second planetary gear set PG2.

The engine E/G is connected with the rotary element, which is connected to the first clutch CL1, of the first planetary gear set, the first clutch CL1 is connected to the rotary element, which is connected to the first brake BK1, of the second planetary gear set PG2, and the output element OUT is connected to one rotary element, which is not connected with the first planetary gear set PG1 and the first clutch CL1, of the second planetary gear set PG2.

The first motor generator MG1 is connected with the rotary element, which is not connected with the first clutch CL1 and the rotary elements of the second planetary gear set PG2, of the first planetary gear set PG1. The second motor generator MG2 is connected to the rotary element, which is not connected with the first clutch CL1 and the output element OUT, of the second planetary gear set PG2.

A second brake BK2 is provided to restrain rotation of the rotary element, which is connected with the second motor generator MG2, of the second planetary gear set PG2.

In an embodiment, as shown in FIGS. 1 and 2, a first ring gear R1 of the first planetary gear set PG1 and a second sun gear S2 of the second planetary gear set PG2 are directly connected, the first clutch CL1 is disposed to connect/disconnect a first carrier C1 of the first planetary gear set PG1 with/from a second ring gear R2 of the second planetary gear set PG2, the engine E/G is connected to the first carrier C1 of the first planetary gear set PG1, the first motor generator MG1 is connected to a first sun gear S1 of the first planetary gear set PG1, the second motor generator MG2 is connected to the second sun gear S2 of the second planetary gear set PG2, the first brake BK1 is disposed to restrain rotation of the second ring gear R2 of the second planetary gear set PG2, the output element OUT is connected to a second carrier C2 of the second planetary gear set PG2, and the second brake BK2 is connected to the second sun gear S2 of the second planetary gear set PG2.

The power train for a hybrid vehicle having the above configuration can be operated in an electrical vehicle (EV) mode, a complex split mode, and an input split mode as described in the table of FIG. 1B. It can also be operated in a fixed gear ratio mode of one stage, which can achieve a predetermined shift ratio while only the engine E/G is operated.

More specifically, the EV mode can be achieved by activating only the second motor generator MG2 with the first brake BK1 engaged, or activating both the first motor generator MG1 and the second motor generator MG2 with the first brake BK1 operated and the first clutch CL1 engaged.

The complex split mode can be achieved by engaging only the first clutch CL1, in which both of the first motor generator MG1 and the second motor generator MG2 are connected to the engine E/G (an input element) and the output element OUT through the first planetary gear set PG1 and the second planetary gear set PG2.

The input split mode can be achieved by engaging only the first brake BK1, in which the second ring gear R2 is fixed and the output element OUT connected to the second carrier C2 is controlled at a predetermined shift ratio by activating the second motor generator MG2 connected to the second sun gear S2.

The first stage fixed gear ratio can be achieved by engaging the first clutch CL1 and the second brake BK2. In this mode, the driving force outputted from the engine E/G is reduced in accordance with the shift ratio of the second planetary gear set PG2 and outputted through the output element OUT connected to the second carrier C2.

Figure 3A:
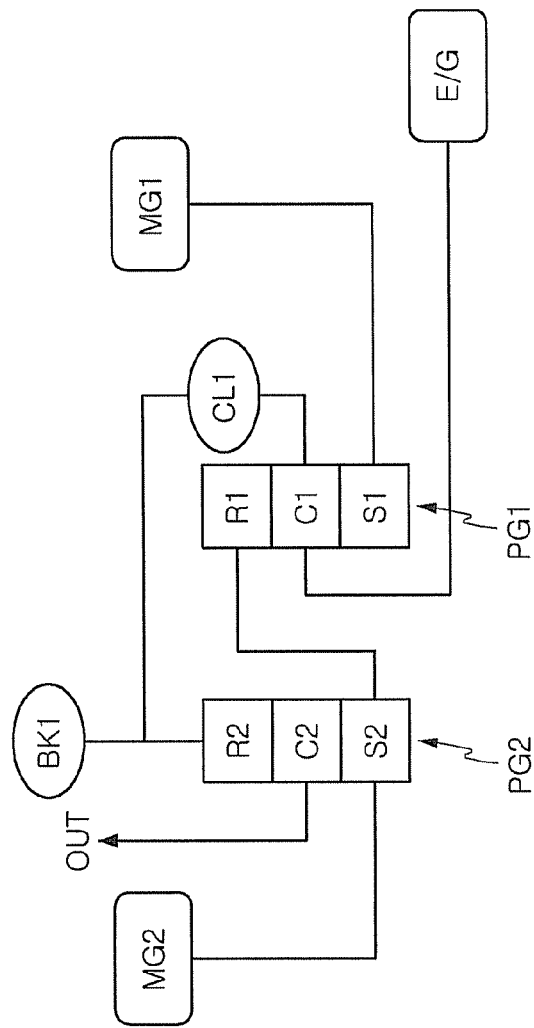

FIGS. 3A-B shows a modified example of the power train of FIGS. 1 and 2, which the second brake BK2 of the power train of FIGS. 1 and 2 is omitted. Accordingly, the power train of FIGS. 3A-B can achieve all the modes except for the first stage fixed gear ratio mode involving operation of the second brake BK2.

Figure 4A:
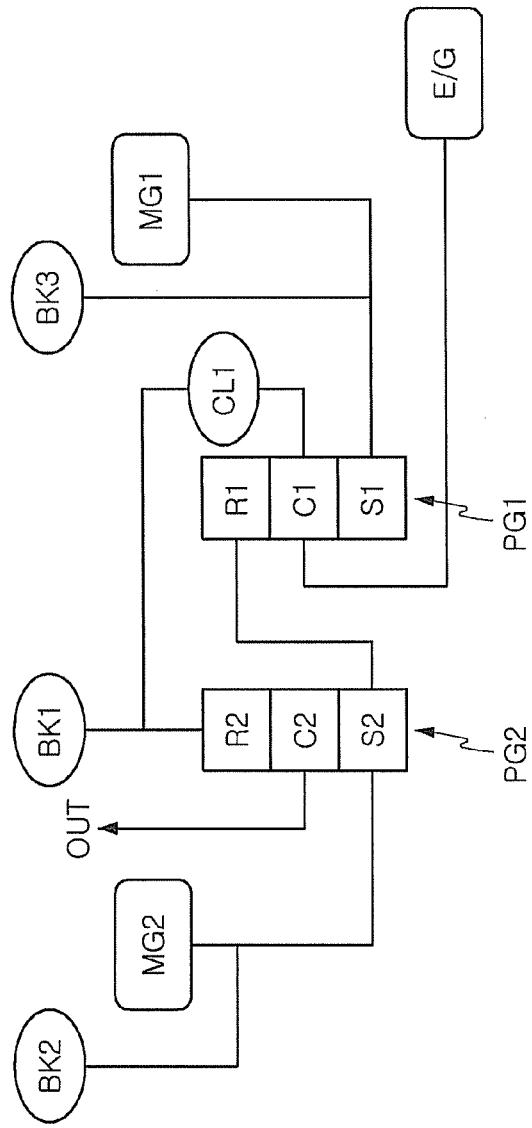
FIGS. 4 A-B are diagrams illustrating the structure and an operation mode table of a power train for a hybrid vehicle according to a second embodiment of the present invention.

In accordance with a second embodiment, as shown FIGS. 4A-B, a third brake BK3 that is configured to restrain rotation of the rotary element, which is connected with the first motor generator MG1, of the first planetary gear set PG1 is added to the power train according to the first embodiment shown in FIGS. 1A-B.

Preferably, the third brake BK3 may be connected to the first sun gear S1 of the first planetary gear set PG1 so as to restrain rotation of the first sun gear S1.

The operation modes of the power train according to the second embodiment are the same as those of the power train according to the first embodiment, except that the power train according to the second embodiment can be operated in the first, second, and third stage fixed gear ratio modes. As the second stage fixed gear ratio mode of the power train according to the second embodiment is achieved by the same way as the first embodiment, the first and third stage fixed gear ratio modes are described herein below.

The first fixed gear ratio mode of the power train according to the second embodiment is achieved by engaging the first brake BK1 and the third brake BK3. In this mode, as the first sun gear S1 is fixed by the third brake BK3, the power of the engine E/G is increased and transmitted to the first ring gear R1 in accordance with the fixed gear ratio of the first planetary gear set PG1, and then the power drives the second sun gear S2 integrally connected with the first ring gear R1. The second ring gear R2 of the second planetary gear set PG2 is fixed by the first brake BK1. As a result, the rotational force of the second sun gear S2 is reduced by the fixed gear ratio of the second planetary gear set PG2 and outputted to the output element OUT through the second carrier C2.

The third stage fixed gear ratio is achieved by engaging the first clutch CL1 and the third brake BK3. In this mode, the power output from the engine E/G is transmitted to the second ring gear R2 of the second planetary gear set PG2 and then increased and outputted to the second carrier C2.

Figure 5A:
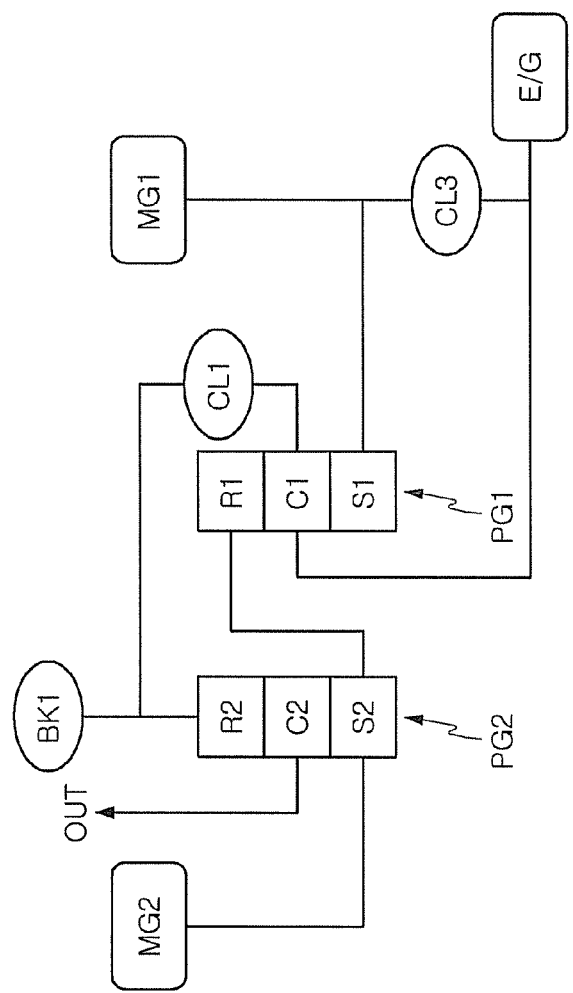
FIGS. 5 A-B are diagrams illustrating the structure and an operation mode table of a power train for a hybrid vehicle according to a third embodiment of the present invention.

In accordance with a third embodiment, as shown FIGS. 5A-B, a third clutch CL3 is added to and the second brake BK2 is removed from the power train according to the first embodiment shown in FIGS. 1A-B.

Preferably, the third clutch CL3 may be disposed to connect/disconnect the rotary elements, which are connected with the engine E/G and the first motor generator MG1, of the first planetary gear set PG1.

The operation modes of the power train according to the third embodiment are the same as those of the power train according to the first embodiment, except that the first and second stage fixed gear ratio modes are achieved in a different way.

That is, the first fixed gear ratio mode is achieved by engaging the first brake BK1 and the third clutch CL3. In this mode, as the third clutch CL3 is engaged, the first planetary gear set PG1 rotates as one unit together with the second sun gear S2 of the second planetary gear set PG2. In this operation, since the first brake BK1 is engaged, the power from the engine E/G is directly transmitted to the second sun gear S2 of the second planetary gear set PG2 and reduced by the fixed gear ratio of the second planetary gear set PG2, and then outputted to the output element OUT through the second carrier C2.

The second fixed gear ratio mode is achieved by engaging the first clutch CL1 and the third clutch CL3. In this mode, the first planetary gear set PG1 operates as one unit by the engagement of the third clutch CL3 and two pairs of the rotary elements of the first planetary gear set PG1 and the second planetary gear set PG2 are directly connected with each other by the engagement of the first clutch CL1. As a result, both of the first planetary gear set PG1 and the second planetary gear set PG2 rotate as one unit, such that the power from the engine E/G is outputted at a shift ratio of 1:1 to the output element OUT.

Figure 6A:
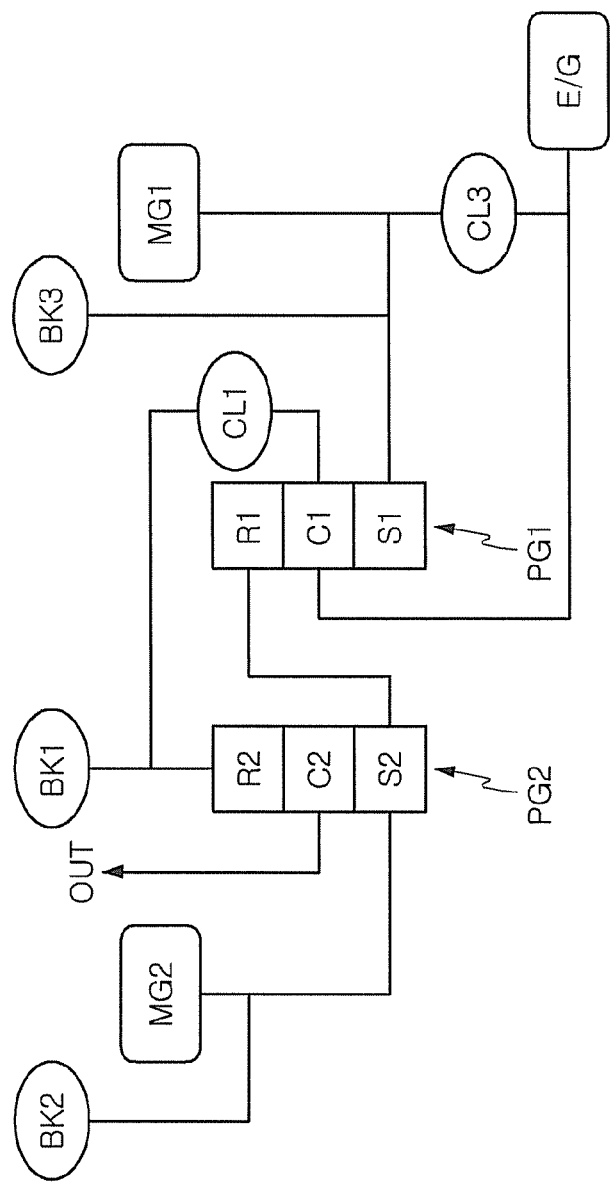

In accordance with a fourth embodiment, as shown FIGS. 6A-B, a third clutch CL3 and a third brake BK2 are added to the power train according to the first embodiment shown in FIGS. 1A-B.

Preferably, the third clutch CL3 may be provided to connect/disconnect two elements of first planetary gear set PG1 and the third brake BK3 may be provided to restrain rotation of the rotary element, which is connected with the first motor generator MG1, of the first planetary gear set PG1.

The operation modes of the power train according to the fourth embodiment are the same as those of the power train according to the first embodiment, except that the power train according to the four embodiment can be operated in the first, second, third, fourth, and fifth stage fixed gear ratio modes.

The first stage fixed gear ratio mode of the power train according to the fourth embodiment is achieved by engaging the first brake BK1 and the third clutch C3, which is the same as the first stage fixed gear ratio mode of the power train according to the third embodiment of FIGS. 5A-B. The second stage fixed gear ratio mode is achieved by engaging the first brake BK1 and the third brake BK3, which is the same as the first stage fixed gear ratio mode of the power train according to the second embodiment of FIGS. 4A-B. The third stage fixed gear ratio mode is achieved by engaging the first clutch CL1 and the second brake BK2, which is the same as the first stage fixed gear ratio mode of the power train according to the first embodiment of FIGS. 1A-B. The fourth stage fixed gear ratio mode is achieved by engaging the first clutch CL1 and the third clutch CL3, which is the same as the second stage fixed gear ratio mode of the power train according to the third embodiment of FIGS. 5A-B. The fifth stage fixed gear ratio mode is achieved by engaging the first clutch CL1 and the third brake BK3, which is the same as the third stage fixed gear ratio mode of the power train according to the second embodiment of FIGS. 4A-B.

FIGS. 7A-C, 8A-B and 9A-B illustrate the power trains according to fifth to seventh embodiments of the present invention. These power trains have a common structure as follows. That is, the power trains include a first planetary gear set PG1 having rotary elements and a second planetary gear set PG2 having rotary elements. At least two pairs of the rotary elements of the first and second planetary gear sets PG1 and PG2 connect/disconnect power transmission therebetween. The power trains further include a first brake BK1 and a second brake BK2 that are respectively connected to the rotary elements, which are connected with the first planetary gear set PG1, of the second planetary gear set PG2 to restrain rotation of the rotary elements. At least two or more independent power sources and an output element OUT are connected to the rotary elements of the first planetary gear set PG1 and the second planetary gear set PG2.

The power source includes an engine E/G and a first motor generator MG1 that are connected to the first planetary gear set PG1, and a second motor generator MG2 that is connected to second planetary gear set PG2. The output element OUT is connected to the second planetary gear set PG2.

A first clutch CL1 and a second clutch CL2 are disposed between the pairs of the rotary elements of the first planetary gear set PG1 and the second planetary gear set PG2, respectively. The engine E/G is connected to the rotary element, which is connected to the first clutch CL1, of the first planetary gear set PG1. The output element OUT is connected to the rotary element, which is not connected with the rotary elements of the first planetary gear set PG1, of the second planetary gear set PG2.

Preferably, the first clutch CL1 is disposed to connect/disconnect a first carrier C1 of the first planetary gear set PG1 with/from a second ring gear R2 of the second planetary gear set PG2. The second clutch CL2 is disposed to connect/disconnect a first ring gear R1 of the first planetary gear set PG1 and a second sun gear S2 of the second planetary gear set PG2.

Further, a first brake BK1 and a second brake BK2 configured to restrain rotation of the rotary elements, which are connected to the first planetary gear set PG1 through the first clutch CL1 and the second clutch CL2, of the second planetary gear set PG2 are provided.

Figure 7A:
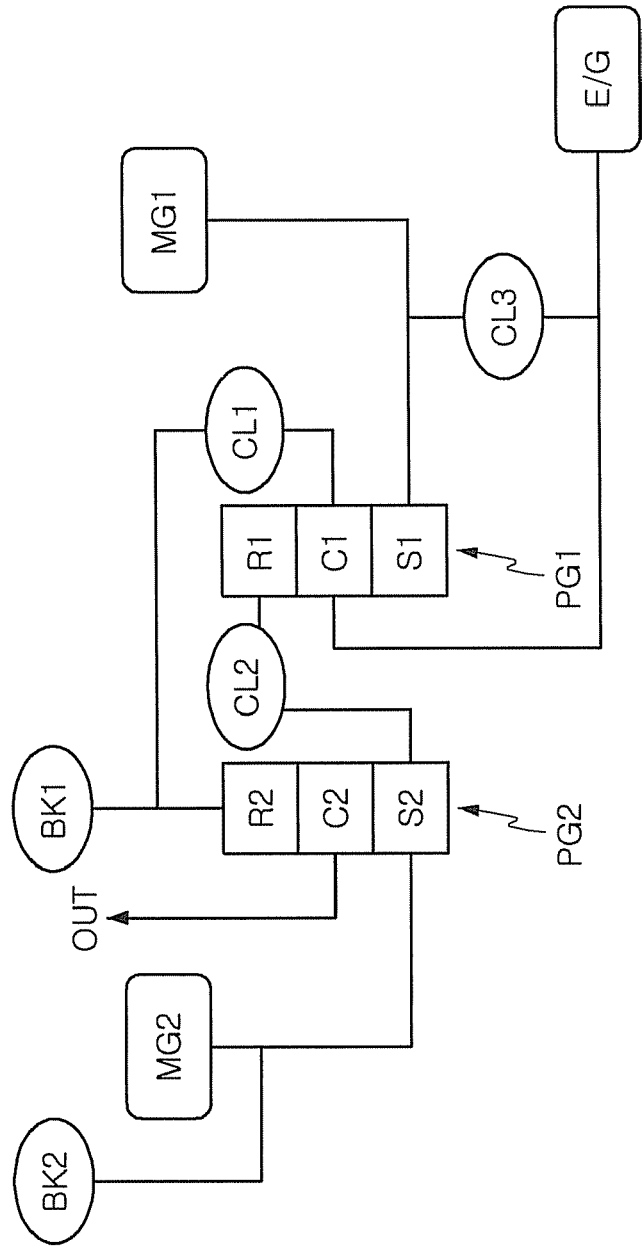
Figure 7C:
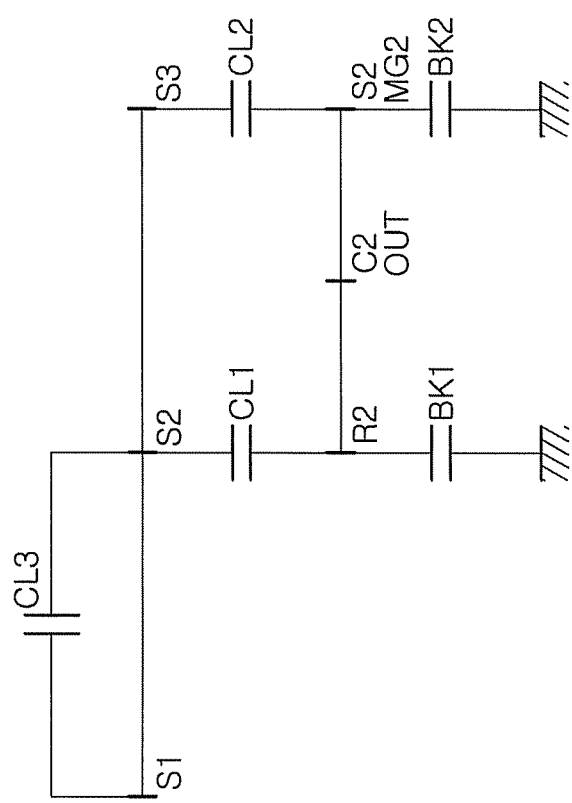

The power train in accordance with a fifth embodiment, as shown FIGS. 7A-C, further includes a third clutch CL3 that is disposed to connect/disconnect the rotary elements, which are connected with first motor generator MG1 and the engine E/G, of the first planetary gear set PG1.

As shown in the operation mode table of FIG. 7B, the power train in accordance with this embodiment can be operated in an EV mode, a complex split mode, an output split mode, an input split mode, and first to third stage fixed gear ratio modes.

Figure 8A:
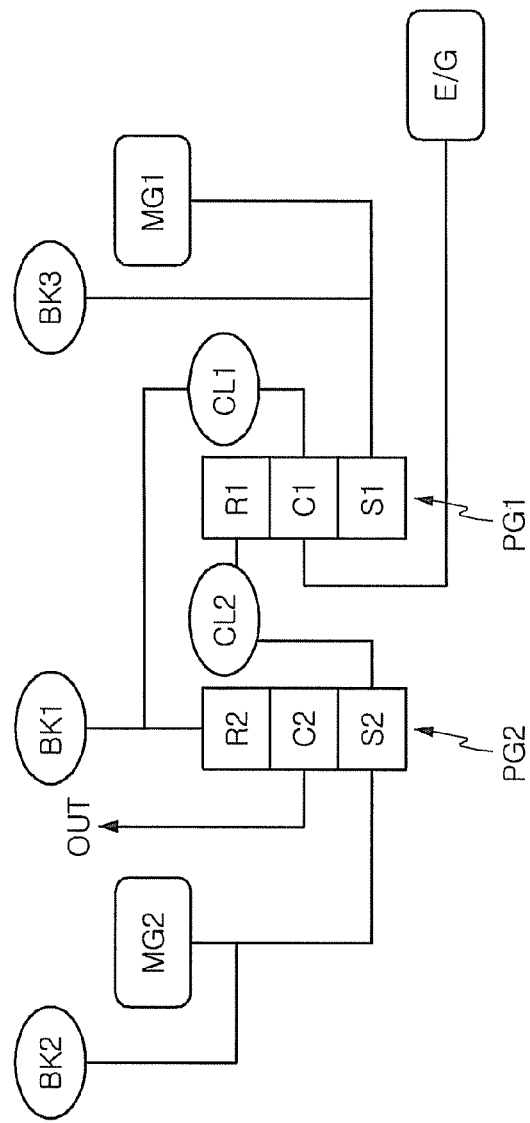

The power train in accordance with a sixth embodiment, as shown FIGS. 8A-B, further includes a third brake BK3 that is connected to connect/disconnect rotation of the rotary element, which is connected with the first motor generator MG1, of the first planetary gear set PG1.

As shown in the operation mode table of FIG. 8B, the power train in accordance with this embodiment can be operated in an EV mode, a complex split mode, an input split mode, and first to third stage fixed gear ratio modes.

Figure 9A:
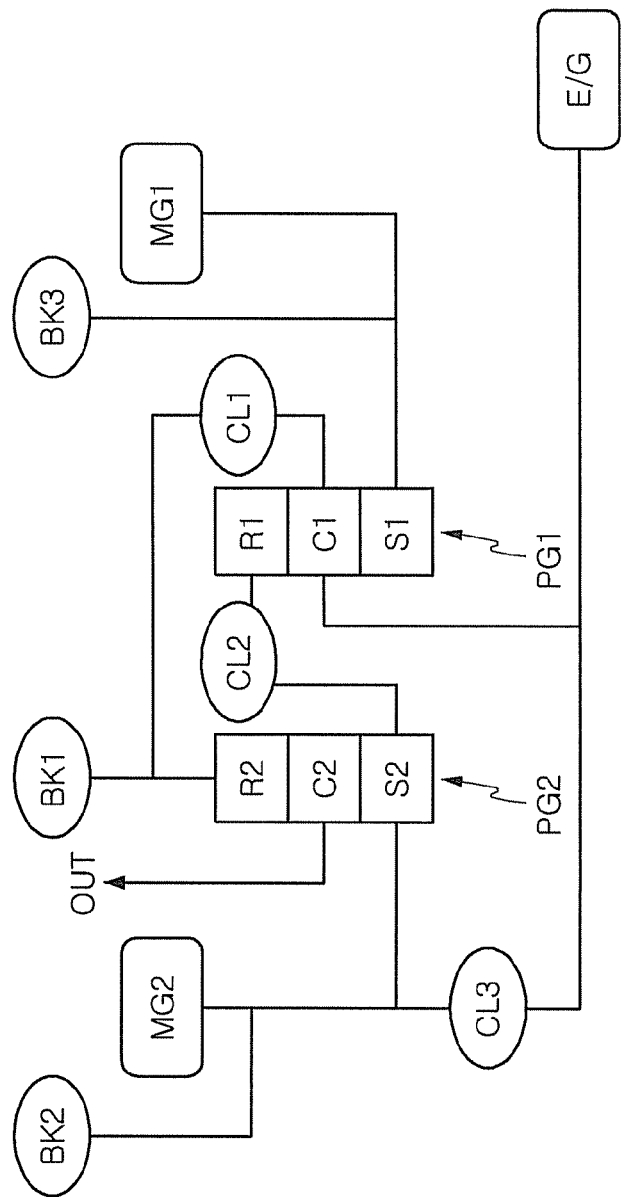
FIGS. 9 A-B are diagrams illustrating the structure and an operation mode table of a power train for a hybrid vehicle according to a seventh embodiment of the present invention.

The power train in accordance with a seventh embodiment, as shown FIGS. 9A-B, further includes a third clutch CL3 that is provided to connect/disconnect the rotary element, which is connected with the engine E/G, of the first planetary gear set PG1 with/from the rotary element, which is connected with the second motor generator MG2, of the second planetary gear set PG2.

As shown in the operation mode table of FIG. 9B, the power train in accordance with this embodiment can be operated in an EV mode, a complex split mode, an input split mode, and first to fifth stage fixed gear ratio modes.

On the other hand, describing the present invention in another way, a hybrid power train has two different power sources, including an engine, in which a first planetary gear set is composed of three rotary elements, a second planetary gear set is composed of three rotary elements, the first rotary element of the first planetary gear set is connected with an input element, the first rotary element of the second planetary gear set is connected with an output element, a first motor generator is connected to the second rotary element of the first planetary gear set, a second motor generator is connected to the second rotary element of the second planetary gear set, the second rotary element of the second planetary gear set and the third rotary element of the first planetary gear set are permanently or selectively connected, such that first power transmission is performed by selectively stopping the third rotary element of the second planetary gear set and second power transmission is performed by selectively connecting the third rotary element of the second planetary gear set with the first rotary element of the first planetary gear set.

In this configuration, third power transmission can be performed by providing a clutch that can selectively transmit power from the input element to the second rotary element of the second planetary gear set.

Further, a third brake is installed to the rotary element connected to the first motor generator and a second brake is installed to the rotary element connected to the second motor generator such that three or more fixed gear ratio modes are achieved by selectively operating the clutches and the brakes.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train for a hybrid vehicle comprising:
   a first planetary gear set including rotary elements;
   a second planetary gear set including rotary elements at least one of which is connected with at least one of the rotary elements of the first planetary gear set;
   a first clutch that is configured to connect/disconnect one of the rotary elements of the first planetary gear set with/from one of the rotary elements of the second planetary gear set; and
   a first brake that is configured to restrain rotation of one rotary element of the second planetary gear set,
   wherein an engine, a first motor, a second motor and an output element are connected to some of the rotary elements of the first planetary gear set and the second planetary gear set,
   wherein the first planetary gear set and the second planetary gear set, and the first motor generator and the second motor generator are coaxially arranged,
   wherein one rotary element of the first planetary gear set is directly connected with one rotary element of the second planetary gear set, and the first clutch is connected with one of the other rotary elements of the first planetary gear set and one of the other rotary elements of the second planetary gear set,
   wherein the engine is connected with the rotary element, which is connected to the first clutch, of the first planetary gear set,
   the first clutch is connected to the rotary element, which is connected to the first brake, of the second planetary gear set, and
   the output element is connected to one rotary element, which is not connected with the first planetary gear set and the first clutch, of the second planetary gear set.

2. The power train for a hybrid vehicle as defined in claim 1, wherein the first motor generator is connected with the rotary element, which is not connected with the first clutch and the rotary elements of the second planetary gear set, of the first planetary gear set and
   the second motor generator is connected to the rotary element, which is not connected with the first clutch and the output element, of the second planetary gear set.

3. The power train for a hybrid vehicle as defined in claim 2, wherein a first ring gear of the first planetary gear set and a second sun gear of the second planetary gear set are directly connected,
   the first clutch is configured to connect/disconnect a first carrier of the first planetary gear set with/from a second ring gear of the second planetary gear set,
   the engine is connected to the first carrier of the first planetary gear set,
   the first motor generator is connected to a first sun gear of the first planetary gear set,
   the second motor generator is connected to the second sun gear of the second planetary gear set,
   the first brake is disposed to restrain rotation of the second ring gear of the second planetary gear set, and
   the output element is connected to a second carrier of the second planetary gear set.

4. The power train for a hybrid vehicle as defined in claim 3, further comprising a second brake that is configured to restrain rotation of the rotary element, which is connected with the second motor generator, of the second planetary gear set.

5. The power train for a hybrid vehicle as defined in claim 4, further comprising a third brake that is configured to restrain rotation of the rotary element, which is connected with the first motor generator, of the first planetary gear set.

6. The power train for a hybrid vehicle as defined in claim 3, further comprising a third clutch that is configured to connect/disconnect the rotary elements, which are connected with the engine and the first motor generator, of the first planetary gear set.

7. The power train for a hybrid vehicle as defined in claim 6, further comprising:
   a second brake that is provided to restrain rotation of the rotary element, which is connected with the second motor generator, of the second planetary gear set; and
   a third brake that is provided to restrain rotation of the rotary element, which is connected with the first motor generator, of the first planetary gear set.

8. A power train for a hybrid vehicle, comprising:
   a first planetary gear set that has three rotary elements;
   a second planetary gear set that has three rotary elements two of which are connected with two of the rotary elements of the first planetary gear set so as to connect/disconnect power transmission therebetween;
   a first brake that is connected to one of the rotary elements of the second planetary gear set that are connected with the rotary elements of the first planetary gear set, so as to restrain rotation of the rotary elements; and
   a second brake that is connected to another one of the rotary elements of the second planetary gear set that are connected with the rotary elements of the first planetary gear set, so as to restrain rotation of the rotary elements,
   wherein at least two or more independent power sources and an output element are connected to the rotary elements of the first planetary gear set and the second planetary gear set.

9. The power train for a hybrid vehicle as defined in claim 8, wherein the power sources includes an engine and a first motor generator that are connected to the first planetary gear set; and a second motor generator that is connected to the second planetary gear set, and wherein the output element is connected to the second planetary gear set.

10. The power train for a hybrid vehicle as defined in claim 9, wherein a first clutch and a second clutch are disposed between the pairs of rotary elements of the first planetary gear set and the second planetary gear set, respectively, the engine is connected to the rotary element, which is connected to the first clutch, of the first planetary gear set, and the output element is connected to the rotary element, which is not connected with any of the rotary elements of the first planetary gear set, of the second planetary gear set.

11. The power train for a hybrid vehicle as defined in claim 8, wherein a first clutch is disposed to connect/disconnect a first carrier of the first planetary gear set with/from a second ring gear of the second planetary gear set, and a second clutch is disposed to connect/disconnect a first ring gear of the first planetary gear set and a second sun gear of the second planetary gear set.

12. The power train for a hybrid vehicle as defined in claim 11, wherein the first brake and the second brake are configured to restrain rotation of rotary elements, which are connected to the first planetary gear set through the first clutch and the second clutch, of the second planetary gear set.

13. The power train for a hybrid vehicle as defined in claim 12, further comprising a third clutch that is disposed to connect/disconnect the rotary elements, which are connected with a first motor generator and a engine, of the first planetary gear set.

14. The power train for a hybrid vehicle as defined in claim 12, further comprising a third brake that is connected to connect/disconnect rotation of the rotary element, which is connected with a first motor generator, of the first planetary gear set.

15. The power train for a hybrid vehicle as defined in claim 14, further comprising a third clutch that is configured to connect/disconnect the rotary element, which is connected with a engine, of the first planetary gear set with/from the rotary element, which is connected with a second motor generator, of the second planetary gear set.

16. A hybrid power train for a vehicle, wherein:
a first planetary gear set has three rotary elements;
a second planetary gear set has three rotary elements;
the first rotary element of the first planetary gear set is connected with an input element;
the first rotary element of the second planetary gear set is connected with an output element;
a first motor generator is connected to the second rotary element of the first planetary gear set;
a second motor generator is connected to the second rotary element of the second planetary gear set; and
the second rotary element of the second planetary gear set and the third rotary element of the first planetary gear set are permanently connected,
such that first power transmission is performed by selectively stopping the third rotary element of the second planetary gear set and second power transmission is performed by selectively connecting the third rotary element of the second planetary gear set with the first rotary element of the first planetary gear set.

17. The hybrid power train as defined in claim 16, wherein third power transmission is performed by providing a clutch that can selectively transmit power from the input element to the second rotary element of the second planetary gear set.

18. The hybrid power train as defined in claim 17, wherein a third brake is installed to the rotary element connected to the first motor generator and a second brake is installed to the rotary element connected to the second motor generator such that three or more fixed gear ratio modes are achieved by selectively operating the clutches and the brakes.

19. A hybrid power train for a vehicle, wherein:
a first planetary gear set has three rotary elements;
a second planetary gear set has three rotary elements;
the first rotary element of the first planetary gear set is connected with an input element;
the first rotary element of the second planetary gear set is connected with an output element;
a first motor generator is connected to the second rotary element of the first planetary gear set;
a second motor generator is connected to the second rotary element of the second planetary gear set; and
the second rotary element of the second planetary gear set and the third rotary element of the first planetary gear set are selectively connected,
such that first power transmission is performed by selectively stopping the third rotary element of the second planetary gear set and second power transmission is performed by selectively connecting the third rotary element of the second planetary gear set with the first rotary element of the first planetary gear set.

20. The hybrid power train as defined in claim 19, wherein third power transmission is performed by providing a clutch that can selectively transmit power from the input element to the second rotary element of the second planetary gear set.

21. The hybrid power train as defined in claim 20, wherein a third brake is installed to the rotary element connected to the first motor generator and a second brake is installed to the rotary element connected to the second motor generator such that three or more fixed gear ratio modes are achieved by selectively operating the clutches and the brakes.

* * * * *